United States Patent [19]

Kutzli

[11] Patent Number: 5,115,707
[45] Date of Patent: May 26, 1992

[54] METHOD FOR SERIES PRODUCTION OF AXIALLY SYMMETRICAL AMMUNITION BODIES AS WELL AS AMMUNITION BODIES PRODUCED ACCORDING TO THIS METHOD

[75] Inventor: Jörg Kutzli, Höfen, Switzerland

[73] Assignee: Schweizerische Eidgenossenschaft Vertretan Durch Die, EIDG, etc., Thun, Switzerland

[21] Appl. No.: 611,172

[22] Filed: Nov. 9, 1990

[30] Foreign Application Priority Data

Jun. 12, 1989 [CH] Switzerland ............... 04373/89

[51] Int. Cl.⁵ ............................................. F42B 3/00
[52] U.S. Cl. ............................... 86/20.1; 86/23; 86/1.1; 102/439; 102/461; 102/473; 102/497
[58] Field of Search ............... 86/20.1, 20.14, 23, 86/1.1; 102/473, 495, 497, 439, 464, 501

[56] References Cited

U.S. PATENT DOCUMENTS

| | | | |
|---|---|---|---|
| 3,298,308 | 1/1967 | Throner, Jr. | 102/67 |
| 4,106,411 | 8/1978 | Borcher et al. | 102/495 |
| 4,450,124 | 5/1984 | Christmann et al. | 86/20.1 |

*Primary Examiner*—J. W. Eldred
*Attorney, Agent, or Firm*—Schweitzer Cornman & Gross

[57] ABSTRACT

An outer jacket (14), an inner jacket (15) and an explosive charge (16) are each independently manufactured on one of three parallel production lines (1, 2, 3) and assembled on a contiguous assembly line (4). The jackets (14 and 15) are designed to have a sufficient shape stability to be handled as separate components, and obtain the required firing strength due to their assembly. By changing the inner jacket (15), the ammunition body manufactured in this way can be prepared with different active bodies as suited for the application intended.

9 Claims, 3 Drawing Sheets

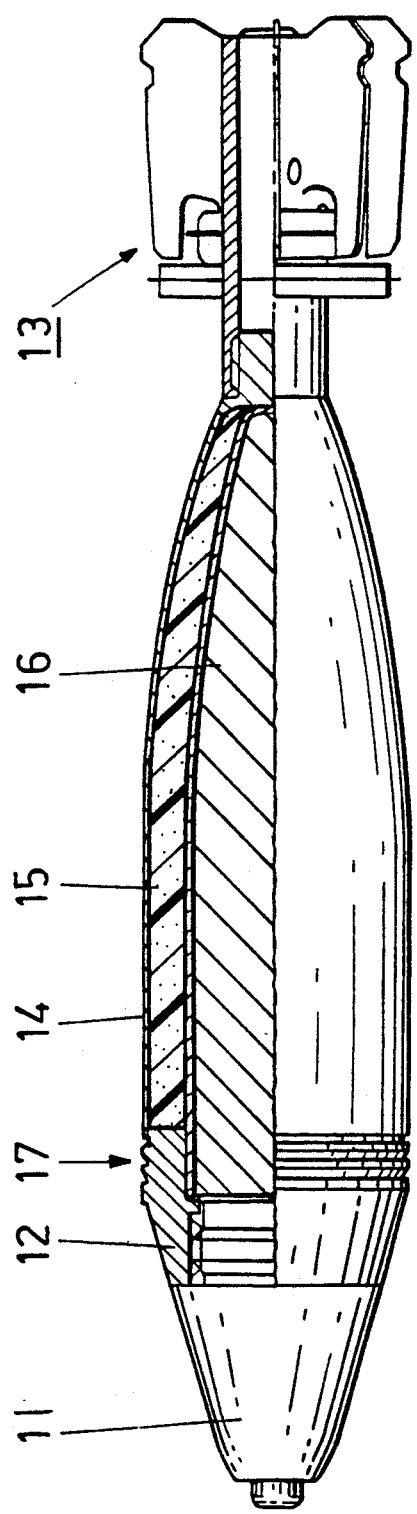
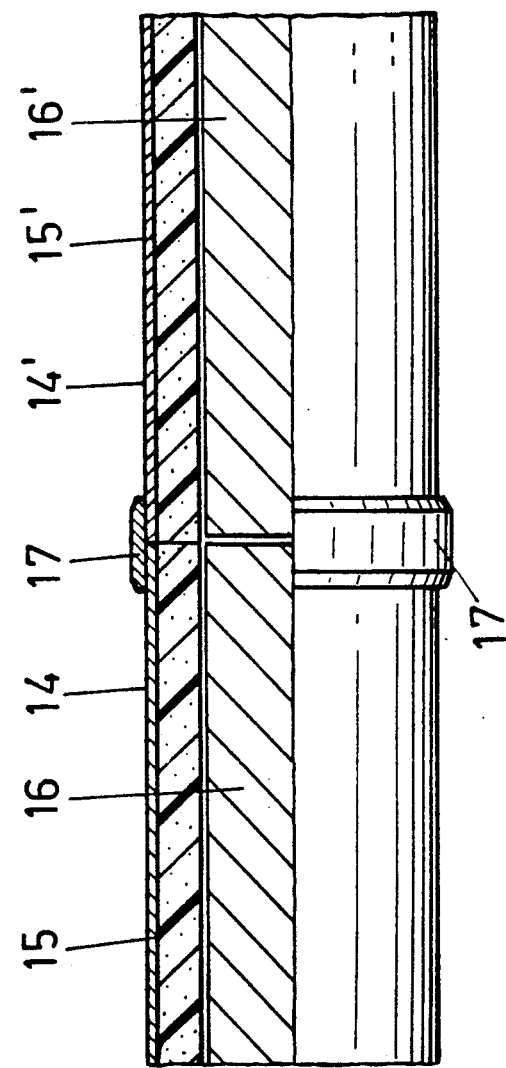
FIG. 2
FIG. 3

METHOD FOR SERIES PRODUCTION OF AXIALLY SYMMETRICAL AMMUNITION BODIES AS WELL AS AMMUNITION BODIES PRODUCED ACCORDING TO THIS METHOD

The invention relates to a method for the series production of axially symmetrical ammunition bodies comprising an outer jacket, an inner jacket designed as active component, and a centrally disposed explosive charge, as well as to an ammunition body produced according to the method.

BACKGROUND OF THE INVENTION

Ammunition bodies, especially artillery or mortar projectiles, are conventionally produced by preparing, individually on a production line, the projectile casing and then introducing into it, by casting, the explosive charge. Subsequently, the flow-over of the cast and solidified explosive has to be removed. Often, an additional mechanical working of the charge is required, such as to make room for a detonator.

A disadvantage of the known method resides in the fact that a change-over of production to a different type of projectile, for instance from explosive ammunition to training ammunition, takes up a considerable amount of time.

As shown by DE-OS 2003990, universally usable projectiles are already known. In these projectiles, according to the desired purpose, it is possible, using a modular system, to combine differing components with the same projectile casing. The projectile described in this disclosure has a projectile jacket surrounding the projectile casing on its outside. In spite of the greater ease of production change-over resulting from such a modular system, the disclosed projectile still requires a relatively cumbersome and therefore time-consuming change-over.

A further drawback of the projectile according to DE-OS 2003990 stems from the fact that both the explosive charge enclosed by the projectile casing and the projectile jacket can be checked or inspected only with difficulty. Such checking can be effected only indirectly, such as by the use of x-rays or ultrasound reflection, which is expensive and requires the use of trained personnel.

U.S. Pat. No. 4,348,956 describes a projectile casing comprised of two housing parts joinable by means of a coupling. This facilitates the opening of the projectile casing for checking of the components therein. This design further facilitates the mounting of different building components for different applications in the projectile casings, which remain of the same configuration. The above disclosure does not, however, deal with the problem of a rapid change-over of production to differently equipped projectiles.

It is an object of the invention to develop a method of the above-mentioned type to permit a rapid change-over between ammunition bodies for different applications, as well as the reliable checking, in a simple manner and also by not particularly trained personnel, of the explosive charge. A further object is the use of the method in the production of ammunition bodies of a configuration that may be varied within wide limits.

BRIEF DESCRIPTION OF THE INVENTION

According to the invention, the first object is achieved in that the outer jacket of the ammunition body, the explosive charge and the inner jacket are produced independently of each other on parallel production lines and are subsequently assembled on an assembly line.

This manufacturing method facilitates the rapid change-over to ammunition of different configurations. As the three production lines extend in parallel directions, it is possible to produce ammunition bodies, such as projectiles, substantially faster than with classical methods which have only one interlinked production line. It is furthermore possible to check all components prior to their being assembled. It is particularly easy to carry out required checking of the explosive charge, as the latter is produced as a separate component, facilitating direct checking before its introduction into the projectile casing. The method according to the invention even permits the separate components to be manufactured in different plants. Thus, production of, for example, a sensitive explosive charge can be carried out in a different factory than that used for production of the mechanical components.

It is particularly advantageous when, in further application of the method according to the invention, the projectile jacket is designed for sliding into the projectile casing, whereby the projectile casing effectively protects the projectile jacket against surface damage by impact, faulty handling, friction in the barrel and other influences. As the projectile jacket further increases the strength of the projectile, the projectile casing can be relatively thin-walled which, among other benefits, has an advantageous effect on costs.

Flexibility of the present invention may be further enhanced by including in the assembly line process the mounting of additional components, such as detonators or tail components.

The outer casing of the ammunition body may greatly vary in accordance with requirements in each case. However, its inherent stability must be great enough to permit problem-free handling during the production process.

The casing may be made particularly thin-walled if its inherent stability is increased, such as by adhesive bonding with the inner jacket, so that the resulting compound structure is able to absorb a large share of the firing or launching stress.

Handling of the separately produced explosive charge is particularly problem-free if the explosive charge is produced by casting the explosive into a thin-walled container. During handling, this container protects the explosive against mechanical stresses. It also constitutes an inert protective casing against chemical effects originating in the projectile jacket which serves as an active component. A thin metal sheet container furthermore can insure a uniform transfer of the detonation wave to the projectile jacket, thus preventing extreme local stresses. In case of fragmentation ammunition, this can also prevent individual, pre-formed fragments from breaking up prematurely prior to, or during, their acceleration, with the associated loss of effectiveness. As the container can be made very thin-walled, it does not interfere to any substantial degree with the cooling of the cast explosive, thus preventing the formation of shrinkage holes and other inhomogeneities.

An alternative method producing the explosive charge consists in pressing the explosive into a thin-walled container. Particularly good adhesion of the explosive in the container is achievable by lacquering the inside of the container prior to the introduction of the explosive.

The second of the objects of the present invention, namely the creation of a projectile manufactured by the method according to the invention, is achieved in that the outer jacket and the inner jacket are firmly fitted into one another at least partly by virtue of their shapes, and complement one another in their inherent stability.

Such an ammunition body can be produced at very low expenditure and, during production, allows great flexibility, facilitating a rapid change-over to a projectile for a different application.

The projectile jacket is of sufficient mechanical strength to be handled as a separate component prior to its assembly into the projectile casing if, according to another feature of the invention, the projectile jacket is configured as a body slidably introducible into the projectile casing, which body consists of active particles embedded in a plastic matrix. Incendiary fragmentation particles, pyrotechnical charges, metallic reaction elements and/or combat substances may be utilized as the active particles.

BRIEF DESCRIPTION OF THE DRAWINGS

Following embodiments of the invention are described with the aid of drawings, wherein:

FIG. 2 shows a partially cut-away elevation view of a mortar projectile produced on the facility of FIG. 1;

FIG. 3 shows a partially cut-away elevation view of a portion of a similarly produced ammunition body for a non-ballistic rocket;

In all Figures, parts having identical functions are given identical reference numerals.

DETAILED DESCRIPTION OF ILLUSTRATIVE EMBODIMENTS

Figure 1:
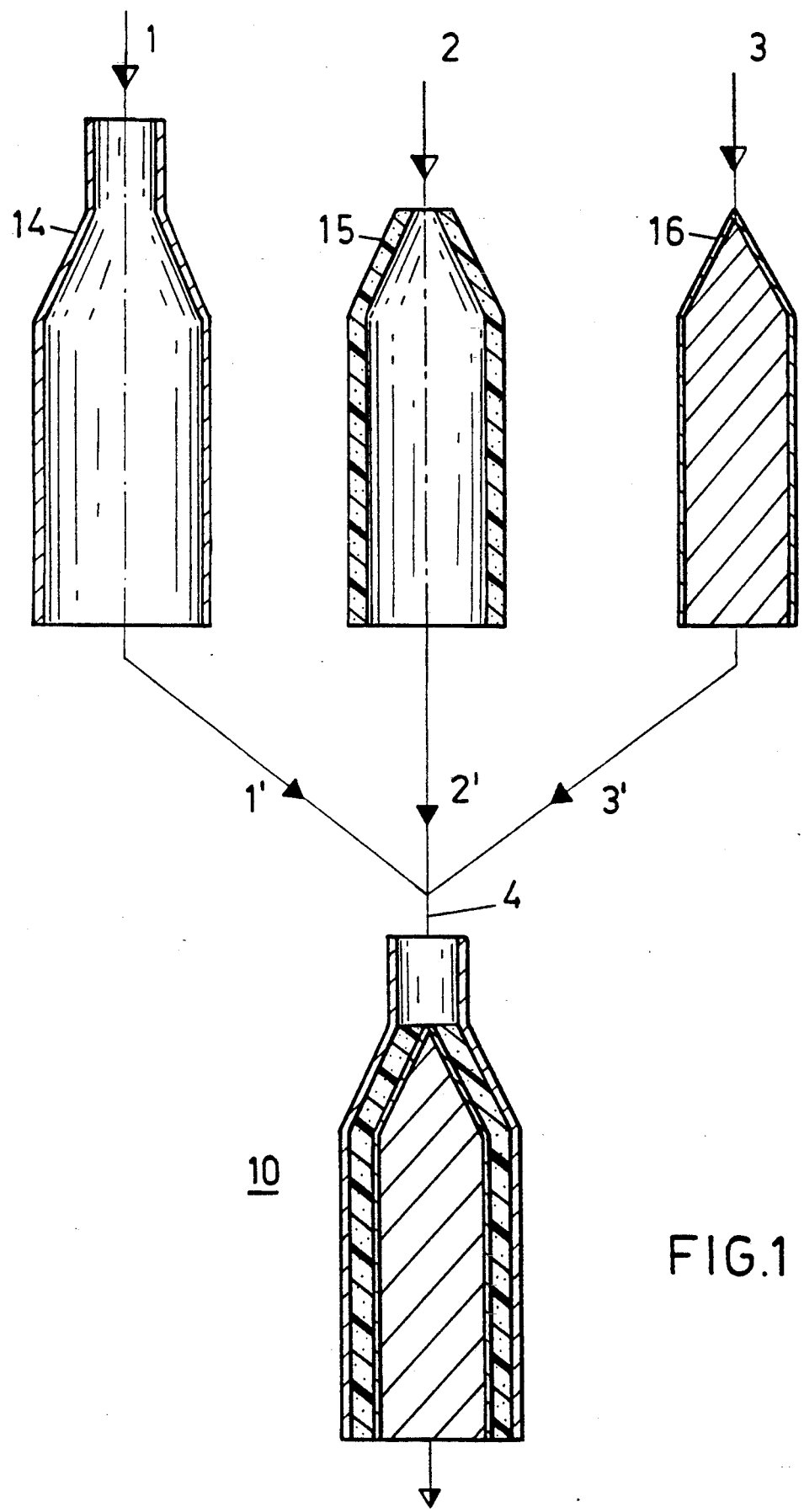
FIG. 1 represents a facility for the production of ammunition bodies consisting of three parallel production lines and one assembly line.

FIG. 1 schematically represents three parallel production lines 1, 2 and 3 which, via deflection conveyors 1', 2' and 3', converge into an assembly line 4. Production line 1 serves exclusively for the production of outer jackets 14. Line 2 serves for the production of inner jackets 15, the active components of the ammunition bodies. The inner jackets are adapted to their respective applications and may consist, for example, of prefabricated fragments embedded in a plastic matrix.

Production line 3 serves for the preparation of the explosive charges 16. These consist of an explosive shaped and compacted by casting or pressing.

The above-mentioned components are assembled to form the completed projectiles on the contiguous assembly line 4. This line may also be utilized to mount additional components, such as detonators or projectile tail components and their stabilizer units, to the projectiles.

In association with this production method, the design of ammunition bodies is as follows:

The mortar projectile of FIG. 2 is provided with a pointed head comprising a detonator or fuse 11 of conventional construction. The head is connected to the outer jacket 14 of the projectile via a steel ring 12 on which are located sliding or sealing rings 17 as known in the art. An inner jacket 15, formed of fragmentation particles, constitutes the active component of the projectile and concentrically surrounds the explosive charge 16. Stabilizer unit 13 is attached to the ammunition body in the usual manner.

The same design is also seen in the ammunition body of FIG. 3, for a guided, non-ballistic rocket (e.g., a cruise missile). The outer jacket sections 14, 14', the inner jacket sections 15, 15', and the tubular explosive charge sections 16, 16' are separately produced and assembled on the assembly line 4. The assembled component sections are forcibly joined together by means of the sealing ring 17.

Figure 4:
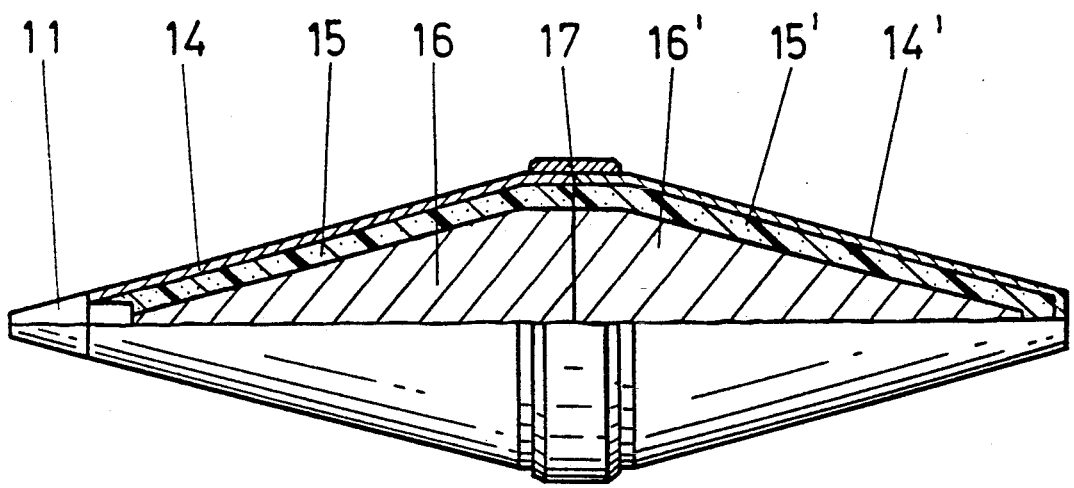
FIG. 4 illustrates a characteristic, rhomboid arrangement for rifle grenades.

As is shown by FIG. 4, even ammunition bodies with very unconventional shapes can be produced according to the production method of the present invention. This figure depicts a rifle grenade of generally rhombic shape.

Figure 5:
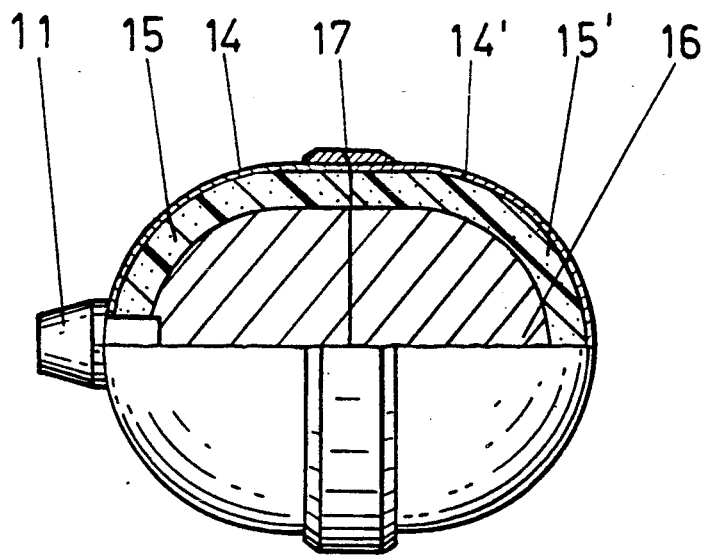
FIG. 5 is an approximately spherical ammunition body.

A further example is represented in FIG. 5, which depicts an ammunition body having an approximately isotropic fragment distribution. This shape construction may be used for hand grenades, as well as for low-flight release bombs.

Due to the precise joining of the separate components, their casing and supporting members can be minimized with regard to the amount of material utilized. By means of mutual adhesive bonding it is possible to transfer, and distribute over the ammunition body, large firing or launching accelerations.

As a consequence of the concentric structure and assembly of the ammunition bodies, their structural design can, to a great extent, be adapted to the mechanical stresses to be expected, the resulting force transference being largely determined and accommodated by such dimensioning. This is a further advantage vis-a-vis conventional manufacturing methods.

The modular principle also permits the inner jackets to be changed in the field to suit tactical requirements.

I claim:

1. A method for the serial production of axially symmetrical ammunition bodies, each of said bodies comprising an outer jacket, an inner jacket designed as an active component, and a centrally disposed explosive charge, comprising the steps of producing the outer jacket on a first production line; simultaneously producing the inner jacket on a second production line; simultaneously producing the explosive charge on a third production line; and subsequently assembling said outer jacket, inner jacket and explosive charge together as they are completed, wherein said assembly step comprises the steps of sliding said inner jacket into said outer jacket and affixing it in place therein; securing said jackets together by adhesive bonding; and sliding said explosive charge into the assembly formed of said inner and outer jackets.

2. The method according to claim 1 comprising the additional step of assembling additional ammunition body components upon said assembly subsequent to said sliding of said explosive charge.

3. An ammunition body comprising an outer jacket manufactured on a first production line; an inner jacket designed as an active component simultaneously manufactured on a second production line, and a centrally disposed explosive simultaneously manufactured on a third production lien, said inner and outer jackets being dimensioned to permit a sliding fit of said inner jacket within said outer jacket, said inner jacket being slid into said outer jacket and with said inner and outer jackets being adhesively joined together, said explosive charge being subsequently slid into said assembled jacket, said inner and outer jackets being formed of materials selected to compliment each other in physical stability.

4. The ammunition body according to claim 3, characterized in that the explosive charge is form fitted to the inner jacket.

5. The ammunition body according to claim 4, characterized in that the explosive charge is surrounded by a thin sheet-metal casing.

6. The ammunition body according to claim 4, characterized in that the inner jacket is configured as a body slidably insertable into the outer jacket, which body contains incendiary fragmentation particles embedded in plastics matrix.

7. The ammunition body according to claim 3, 4 or 5, characterized in that the inner jacket contains at least one pyrotechnical charge.

8. The ammunition body according to claim 3, 4 or 5, characterized in that the inner jacket contains at least one metallic reaction element.

9. The ammunition body according to claim 3, 4 or 5, characterized in that the inner jacket contains weapon-type elements within a mechanical binder.

* * * * *

UNITED STATES PATENT AND TRADEMARK OFFICE
CERTIFICATE OF CORRECTION

PATENT NO. : 5,115,707
DATED : May 26, 1992
INVENTOR(S) : Jorg Kutzli

It is certified that error appears in the above-indentified patent and that said Letters Patent is hereby corrected as shown below:

Column 4, line 65 "lien" should read --line--.

Signed and Sealed this

Fifth Day of October, 1993

BRUCE LEHMAN

*Attest:*

*Attesting Officer*      Commissioner of Patents and Trademarks